B. T. BABBITT.
APPARATUS FOR COMPRESSING AIR.

No. 103,121.        Patented May 17, 1870.

United States Patent Office.

BENJAMIN T. BABBITT, OF NEW YORK, N. Y.

Letters Patent No. 103,121, dated May 17, 1870.

IMPROVEMENT IN AIR-COMPRESSING APPARATUS.

The Schedule referred to in these Letters Patent and making part of the same.

To all whom it may concern:

Be it known that I, BENJAMIN T. BABBITT, of the city, county, and State of New York, have invented a new and useful Improvement in Apparatus for Compressing Air, of which the following is a full, clear, and exact description, reference being had to the accompanying drawing forming part of this specification, and in which—

Figure 1:
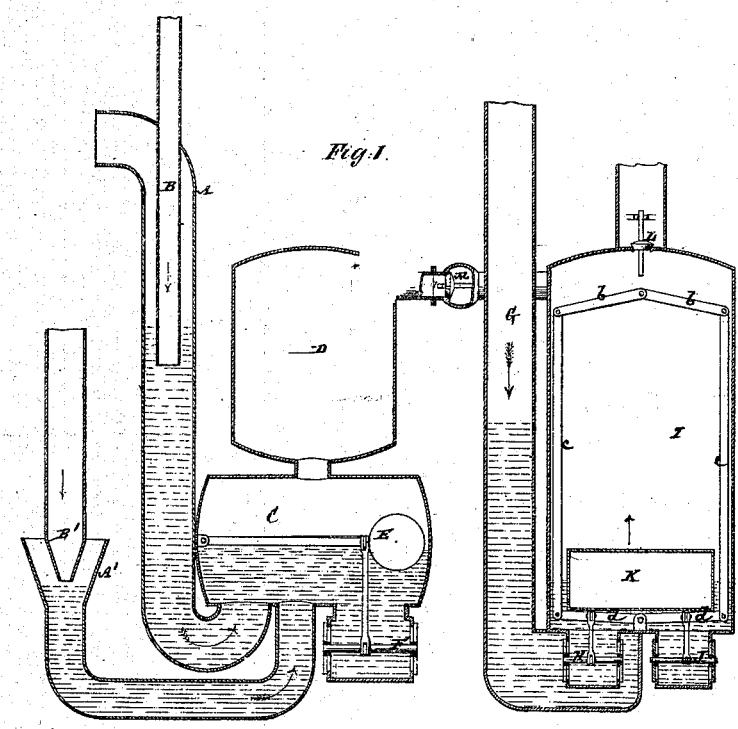
Figure 2:

Figure 1 represents a sectional elevation of an apparatus for compressing air, constructed in accordance with my improvement, and Figure 2, a face view of one of the valves used therein.

Similar letters of reference indicate corresponding parts.

My invention consists in an apparatus for compressing air, applicable to a variety of purposes, in which a fall of water is used in a direct manner as the motive power, firstly, by causing it to suck or draw in air, and produce a partial compression within a supply-chamber, and, secondly, by making a fall operate on a float within a receiver that draws its charge of air, in the fall of the foat, from the supply-chamber, and in which said air is further compressed by the rise of the float acting as a ram, the whole being automatic in its action, substantially as hereinafter described.

Referring to the accompanying drawing—

A and A' represent two modifications of water-pipes with differently-shaped air-pipes B B' arranged to enter them from above, either or both of which may be used, the water, that may be derived from any suitable fall, causing, as it passes down through the the outer pipe A or A, air to be sucked through the pipe B or B', and to enter, together with the water, a trap, C, in which the water rises, while the air that is partially compressed passes to a supply-chamber, D.

This trap D is automatic in its action, by arranging within it a float, E, of any suitable description, and connecting the same with an outlet-valve, F, preferably of balance construction, and that may be made of ordinary ventilator form, duplicated on reverse sides of its chamber.

The float E, in risirg above a central level, opens the valve F, and allows of the entering water to run off, while, in falling below such level, it closes the valve, and allows of the water rising in the trap to repeat or continue the compression of the air sucked or drawn in with the water, which air passes into the supply-chamber D. In this way a fixed partial compression of the incoming air is kept up.

G is an additional pipe, down which, on the opening of a valve, H, a fall of water is made to pass and enter from below a receiver, I, that is also provided at or near its bottom with a discharge-valve, J.

These valves H and J may be of similar construction to the valve F, or of any other suitable description, but it is preferred to have them balance-valves.

Within the receiver I is a float, K, that, in rising, by the admission of water through the valve H, acts as a ram, and compresses the air in the receiver from whence it may escape or be led, as required, by the opening of a valve, L, which, if desired, may be weighted. The air is supplied to the receiver I in a partially compressed condition from the supply-chamber D.

This occurs during the fall of the float K, and said air is prevented from returning or being compressed back into the supply-chamber during the rising of said float by a check-valve, M, arranged within the pipe which connects the chamber D and receiver I.

As the float K completes its upward or compressing stroke it strikes levers b b, which are connected by rods c c to valve-operating levers d d, and closes the inlet-valve H, and opens the discharge-valve J. This allows the water in the receiver to run out and shuts off all further admission of water to the receiver, so that the float falls, the receiver becomes charged with a fresh supply of air from the supply-chamber D, and on the float K falling to a certain level it strikes the levers d d, and reverses the action by again opening the inlet-valve H, and closing the outlet-valve J, whereby a renewed compression of the air takes place in the receiver I. Such action is repeated as long as the fall of water is kept running, and a perfect automatic action secured to the apparatus.

What is here claimed, and desired to be secured by Letters Patent, is—

The combination of one or more water-pipes A, air-pipes B, and the trap C, with its valve and float, the chamber D, receiver I, water-supply pipe G, inlet and outlet-valves H and J, and the check-valve M, substantially as specified.

B. T. BABBITT.

Witnesses:
FRED. HAYNES,
HENRY PALMER.